United States Patent
Kovinskaya et al.

(10) Patent No.: US 7,310,200 B2
(45) Date of Patent: Dec. 18, 2007

(54) RESONANCE RESPONSE SEPARATION FOR AXIALLY ALIGNED ROTATABLE DISCS

(75) Inventors: Svetlana I Kovinskaya, Edmond, OK (US); Arnold G Slezak, Yukon, OK (US); John D Stricklin, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 756 days.

(21) Appl. No.: 10/301,907

(22) Filed: Nov. 22, 2002

(65) Prior Publication Data

US 2004/0032690 A1 Feb. 19, 2004

Related U.S. Application Data

(60) Provisional application No. 60/404,112, filed on Aug. 15, 2002.

(51) Int. Cl.
*G11B 17/08* (2006.01)
(52) U.S. Cl. .................................... 360/98.08
(58) Field of Classification Search .............. 360/98.08
See application file for complete search history.

(56) References Cited

U.S. PATENT DOCUMENTS

| | | | |
|---|---|---|---|
| 5,490,022 A | 2/1996 | Hoshina et al. | |
| 6,064,547 A * | 5/2000 | Wittig et al. | 360/98.08 |
| 6,208,486 B1 | 3/2001 | Gustafson et al. | |
| 6,215,617 B1 | 4/2001 | Okumura et al. | |
| 6,222,700 B1 | 4/2001 | Martin et al. | |
| 6,282,054 B1 * | 8/2001 | Luo | 360/98.08 |
| 6,414,817 B1 * | 7/2002 | Luo et al. | 360/98.08 |
| 6,456,455 B2 * | 9/2002 | McCutcheon et al. | 360/98.08 |
| 6,707,637 B1 * | 3/2004 | Codilian et al. | 360/98.08 |
| 6,791,791 B1 * | 9/2004 | Alfred et al. | 360/98.08 |
| 2002/0071205 A1 | 6/2002 | Koyanagi et al. | |

* cited by examiner

*Primary Examiner*—Hoa T. Nguyen
*Assistant Examiner*—Mark Blouin
(74) *Attorney, Agent, or Firm*—Fellers, Snider, et al.

(57) ABSTRACT

An apparatus separating a resonance excitation response of a first disc from a resonance excitation response of second disc, the apparatus includes spindle motor with a spindle motor hub supporting the first disc, a disc spacer communicating with the first disc supporting a second disc and a clamp ring attached to this on the motor hub imparting a clamping force on the second disc to form a disc pack. Separation of resonance response between the first disc and the second disc results from maintaining a distinction between an amount of extension of mass and stiffness of each disc available for resonance excitation beyond respective outboard clamping points of the disc spacer. Separation of resonance assures resonance of the first disc is dissipated by a damping of the spindle motor, as well as resonance of the second disc is dissipated by the damping of the spindle motor.

19 Claims, 3 Drawing Sheets

RESONANCE RESPONSE SEPARATION FOR AXIALLY ALIGNED ROTATABLE DISCS

RELATED APPLICATIONS

This application claims priority to U.S. Provisional Application No. 60/404,112 filed Aug. 15, 2002 entitled "Spacer for Separating Disc Resonances while Minimizing Disc Distortion."

FIELD OF THE INVENTION

The claimed invention relates generally to the field of digital data storage systems, and more particularly but not by way of limitation, to separation of resonances between discs while minimizing distortion of the discs for a data storage device.

BACKGROUND

Disc drives are used for data storage in modem electronic products ranging from digital cameras to computers and network systems. Ordinarily, a disc drive includes a mechanical portion, or head disc assembly, and electronics in the form of a printed circuit board assembly mounted to an outer surface of the head disc assembly. The printed circuit board assembly controls functions of the head disc assembly and provides a communication interface between the disc drive and a host being serviced by the disc drive.

The head disc assembly has a disc with a recording surface rotated at a constant speed by a spindle motor assembly and an actuator assembly positionably controlled by a closed loop servo system. The actuator assembly supports a read/write head that writes data to and reads data from the recording surface.

The disc drive market continues to place pressure on the industry for disc drives with increased capacity at a lower cost per megabyte, higher rates of data throughput, and improved reliability.

As capacities increase and performance demands rise, disc drives become more susceptible to non-repeatable disturbances that occurred during the operation of the disc drive. Non-repeatable disturbances occurring at frequencies that imparted a resonance to the discs of a disc drive can cause the closed loop servo system to malfunction during track following operations or read/write errors during data transfer operations. Occurrences of either a servo system malfunction or read/write error directly impacts the overall performance of the disc drive.

Disc drives operating with a plurality of substantially identical discs, wherein each of the discs of the plurality of discs is responsive to substantially the same resonance frequencies heighten the opportunity for malfunction by the servo system or the occurrence of read/write errors during data transfer operations. The increase of opportunity for read/write errors results from appearance of coupling between discs resonating at the same frequencies. This coupling multiplies the number of disc resonances and increases the amplitude response at the resonances because discs support each other in closed resonating mode.

As such, challenges remain and a need persists for improvements in management of disc resonances for improved operational performance of the disc drive.

SUMMARY OF THE INVENTION

In accordance with preferred embodiments, an apparatus is provided for disc resonance response separation. The apparatus includes a spindle motor hub that supports a first disc and a disc spacer communicating with the first disc while supporting a second disc. The first disc, disc spacer and the second disc collectively form a disc stack, and a clamp ring secured to the spindle motor hub imparts a clamping force on the disc stack to assure mechanical alignment of the disc stack over the life of the disc drive. To maintain separation in resonance response between each disc, the first disc provides an extension of mass and stiffness available for resonance excitation distinct from an extension of mass and stiffness of the second disc available for resonance excitation.

These and various other features and advantages that characterize the claimed invention will be apparent upon reading the following detailed description and upon review of the associated drawings.

DETAILED DESCRIPTION

Figure 1:
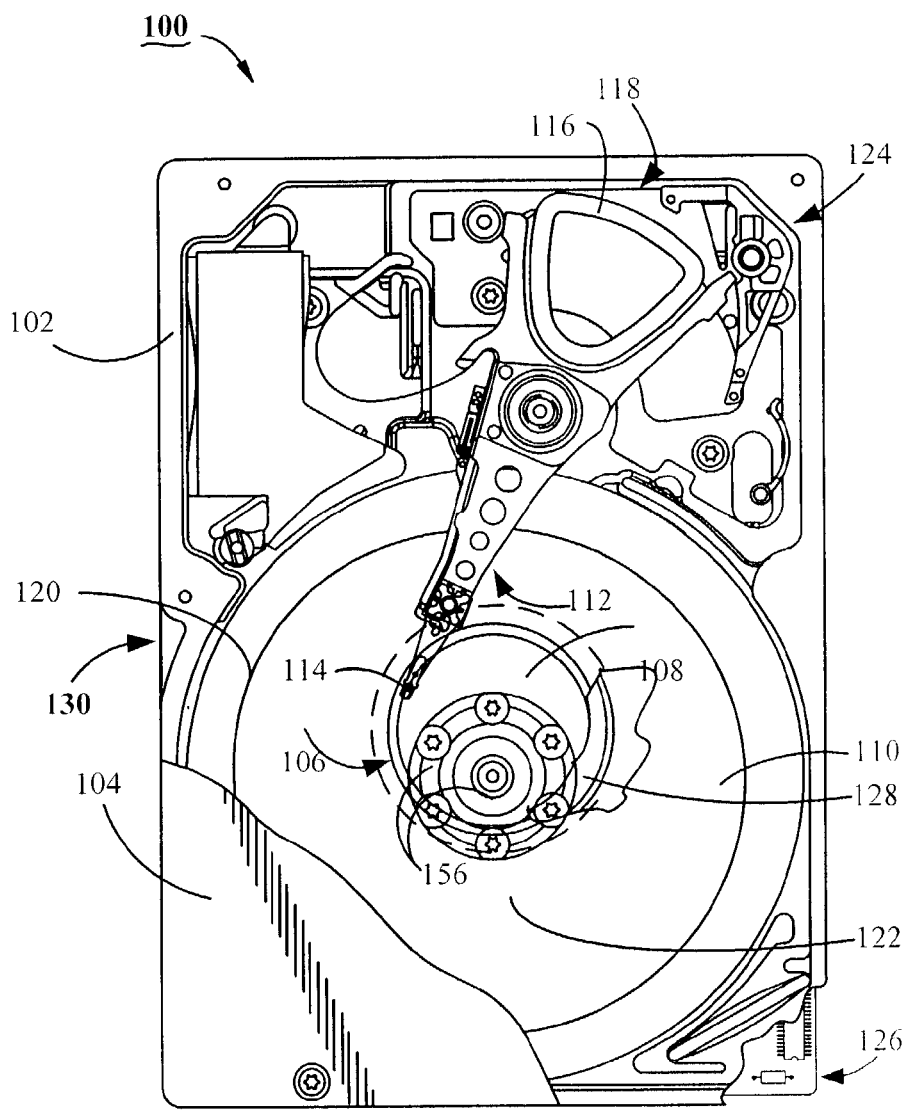
FIG. 1 is a plan view of a disc drive constricted and operated in accordance with preferred embodiments of the present invention.

Referring now to the drawings, FIG. 1 provides a top plan view of a disc drive 100. The disc drive 100 includes a rigid base deck 102, which cooperates with a top cover 104 (shown in partial cutaway) to form a sealed housing for the device. A spindle motor 106 with a spindle motor hub 108 rotates a number of magnetic data storage discs 110 at a constant high speed. A rotary actuator 112 supports a number of data transducing heads 114 (also referred to herein as read/write heads 114 or heads 114) adjacent the discs 110. The actuator 112 is rotated through application of a current to a coil 116 of a voice coil motor (VCM) 118.

During data transfer operations with a host device (not shown), the actuator 112 moves the heads 114 to concentric data tracks (one represented at 120) on the surfaces of the discs 110 to write data to and read data from the discs 110. When the disc drive 100 is deactivated, the actuator 112 moves the heads 114 to texturized landing zones 122; the actuator 112 is then confined by latching a toggle latch 124. Command and control electronics for the disc drive 100 are provided on a printed circuit board assembly (PCB) 126 mounted to the underside of the base deck 102. A disc spacer 128 is positioned between a second surface of a first disc of the discs 110 and a first surface of a second disc of the discs 110 to assure sufficient clearance for access of a head 114 associated with each surface. The mechanical portion of the disc drive 100 is referred to as a head disc assembly 130.

Figure 2:
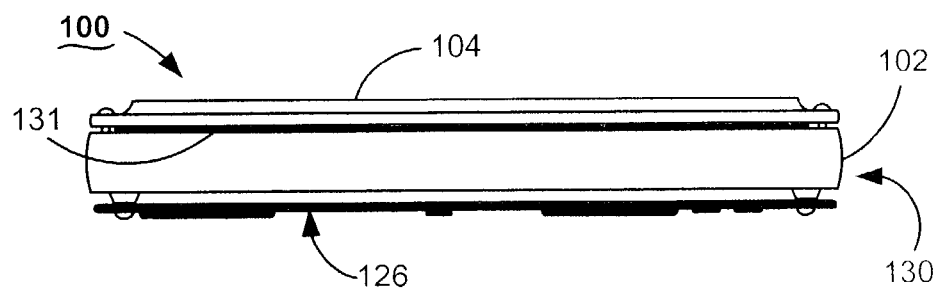
FIG. 2 is an elevational view of the disc drive of FIG. 1.

Turning to FIG. 2, shown therein is a printed circuit board assembly 126 attached to the basedeck 102 of the disc drive 100. Also shown is a gasket 131 compressed between the top cover 104 and the basedeck 102. The gasket 131 in conjunction with the top cover 104 and a basedeck 102 provides a substantially isolated environment for operation of the head disc assembly 130.

Figure 3:
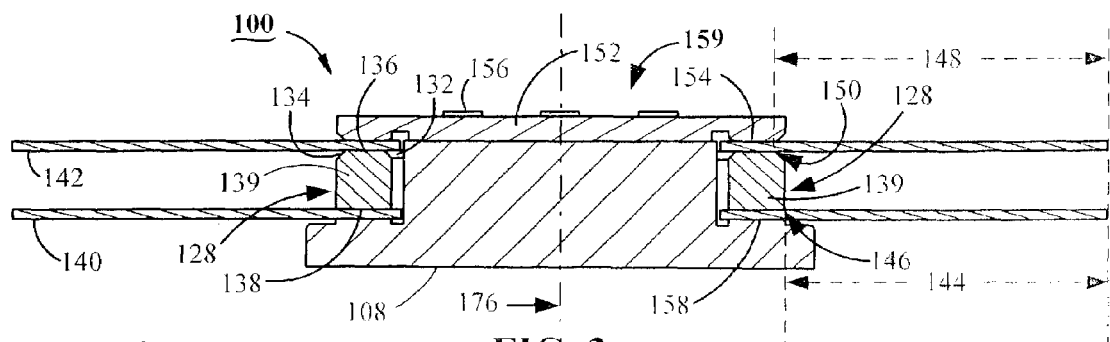
FIG. 3 is an elevational partial cross-sectional view of the disc drive of FIG. 1.

As shown by FIG. 3, the disc spacer 128 is made of one (or a single) uniform material (figures 3-7) and includes an inner diameter chamfer 132 and an outer diameter chamfer 134. Between the inner diameter chamfer 132 and the outer diameter chamfer 134 is a first clamping surface 136 of the disc spacer 128. It is noted that a surface area of the first clamping surface 136 is less than a surface area of a second clamping surface 138. The first clamping surface 136 is separated from the second clamping surface 138 by a spacer body portion 139. The difference between the clamping surface areas of the first clamping surface 136 and the second clamping surface 138 provides an extension of mass and stillness available for resonance excitation of the first disc 140 distinct from the extension of mass and stiffness available for resonance excitation of the second disc 142. A difference in the extension of mass and stiffness available for resonance excitation between the first disc 140 and the second disc 142 creates a separation of resonance excitation response between the first disc 140 and the second disc 142. Separation of resonance excitation response between the discs 140 and 142 occurs, because members of substantially similar configuration that have different amounts of extension of mass and stiffness available for resonance excitation resonate at different frequencies.

In a preferred embodiment, the extension of mass and stiffness of a disc available for resonance excitation is an amount of radial extent of the disc beyond an outboard clamping point of the disc spacer 128. The amount of radial extent 144 of the first disc 140 extending beyond an outboard clamping point 146 of the second clamping surface 138 of the disc spacer 128 is less than the amount of radial extent 148 or the second disc 142 extending beyond an outboard clamping point 150 of the first clamping Surface 136 of the disc spacer 128.

FIG. 3 also shows a clamp ring 152 with a clamp surface 154 that has a surface area substantially the same as a surface area of the first clamping surface 136 of the disc spacer 128. The clamp ring 152 is secured to the spindle motor hub 108 by a plurality of fasteners 156. The plurality of fasteners 156 provides a compressive load on the clamp ring 152. The clamp ring 152 imparts a clamping force on the second disc 142 to substantially secure the second disc 142 relative to the clamp ring 152. The clamping force is transmitted through the second disc 142 to the disc spacer 128 to substantially secure the disc spacer 128 relative to the second disc 142. The clamping force is further transmitted through the disc spacer 128 to the first disc 140 to substantially secure the first disc 140 relative to the disc spacer 128. The clamping force is still further transmitted through the first disc 140 to a clamp support surface 158 of the spindle motor hub 108 to secure the first disc 140 relative to the clamp support surface 158.

It has been found that by maintaining substantial radial alignment, relative to a rotational access of the spindle motor hub 108, between centrums of the clamp surface 154 of the clamp ring 152; the first clamping surface 136 of the disc spacer 128; the second clamping surface 138 of the disc spacer 128; and, the clamp support surface 158 of the spindle motor hub 108, deters distortion of the first disc 140 as well as distortion of the second disc 142 as a result of imparting the clamping force on the second disc 142. In addition to substantial radial alignment, the geometric shape of the clamp surface 154 of the clamp ring 152 substantially mirrors the geometric shape of the first clamping surface 136 of the disc spacer 128, and the geometric shape of the clamp support surface 158 of the spindle motor hub 108 substantially mirrors the geometric shape of the second clamping surface 138 of the disc spacer 128, which further reduces disc distortion.

In other words, maintaining radial alignment of the centrums of the clamping surfaces while applying the clamping force and substantially mirroring the geometric shape between opposing clamping surfaces reduces disc distortion, in particular coning of the discs. The spindle motor 106 (of FIG. 1) with the spindle motor hub 108, the discs 140 and 142, the disc spacer 128, the clamp ring 152 and the fasteners 156 form a disc pack 159. Under the clamping force provided by the fasteners 156, the disc pack 159 inherently has disc pack balance modes. By creating the separation of resonance excitation response between the first disc 140 and the second disc 142, energy imparted on the system by mechanical shock causing a resonance excitation response from the first disc 140 will fail to cause a resonance excitation response from the second disc 142 and vice versa. In other words, a change in the natural frequency of the amount of disc available for resonance response for each disc results from making the outboard clamping point for each disc distinct. A difference in the outboard clamping point for each disc changes both the extension of mass and the stiffness of the disc available for resonance response. By separating the natural frequency of the first disc 140 and the second disc 142, the inherent disc pack balance modes of the disc pack 159 are substantially rendered unobservable because a resonance response of the first disc 140 is not sympathetically propagated by a resonance response of the second disc 142 but rather dissipated by the damping of the spindle motor 106 and visa versa.

An benefit of separating the natural frequency of the first disc 140 from the second disc 142 is a separation of the (0,0) and (0,1) modes of each disc. The (0,0) and (0,1) modes of each disc become disc pack balance modes of the disc pack 159, which have reaction forces transmitted to ground through the spindle motor 106. Having the (0,0) mode and the (0,1) of the first disc 140 distinct from the (0,0) and (0,1) mode of the second disc 142, promotes dissipation of the energy of the (0,0) and (0,1) modes of each disc through the damping of the spindle motor 106 without imparting a sympathetic excitation between the discs. For a spindle motor 106 incorporating a fluidic bearing, separation of the (0,0) and (0,1) modes of each disc renders these modes nearly unobservable due to the high damping of the bearing.

Additionally, with the separation of resonance excitation response between the first disc 140 and the second disc 142 reduces the occurrence of non-repeatable run out induced errors experienced by the read/write head 114 during track following operations and during data transfer operations because the vibration of the unbalanced modes of the discs 140 and 142 are dissipated by the damping of the spindle motor 106.

Figure 4:
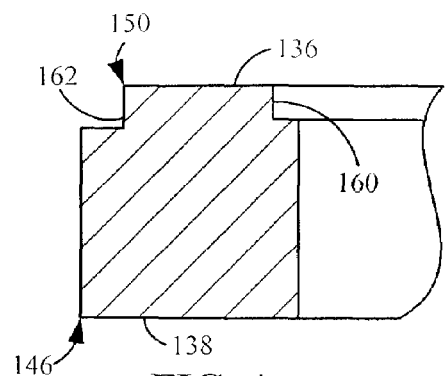
FIG. 4 is an elevational partial cutaway cross-sectional view of a disc spacer of the disc drive of FIG. 1.
Figure 5:
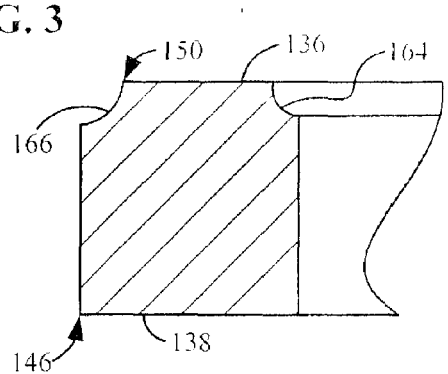
FIG. 5 is an elevational partial cutaway cross-sectional view of an alternate disc spacer of the disc drive of FIG. 1.
Figure 6:
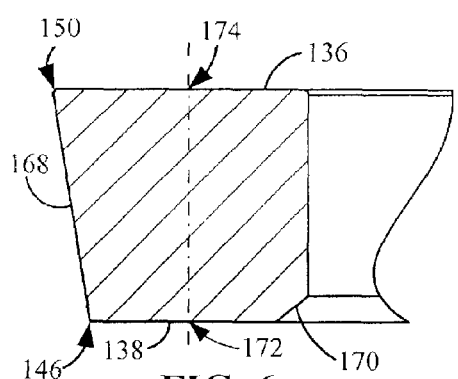
FIG. 6 is an elevational partial cutaway cross-sectional view of another alternate disc spacer of the disc drive of FIG. 1.

FIGS. 4, 5, and 6 are alternate embodiments of the disc spacer 128 (of FIG. 3). Each alternate embodiment provides a dimensional difference between the first clamping surface 136 of the disc spacer 128 and the second clamping surface 138 of the disc spacer 128. FIG. 4 shows an inner step relief 160 and an outer step relief 162 defining the boundaries of the first clamping surface 136. The inner step relief 160 and the outer step relief 162 provide the dimensional difference between the first clamping surface 136 and the second clamping surface 138, thereby allowing extension of mass and stiffness available for resonance excitation to be distinct between the first disc 140 and the second disc 142 (of FIG. 3).

FIG. 5 shows an inner flute relief 164 and an outer flute relief 166 as a means for providing the dimensional difference between the first clamping surface 136 and the second clamping surface 138, which promotes a difference in extension of mass and stiffness available for resonance excitation between the first disc 140 (of FIG. 3) and the second disc 142 (of FIG. 3).

FIG. 6 shows an external tapered wall 168 that provides the dimensional difference between the first clamping surface 136 and the second clamping surface 138 to achieve a separation in resonance response between the first disc 140 (of FIG. 3) and the second disc 142 (of FIG. 3). Separation in resonance response is achieved by setting the outboard clamping point 150 of the first clamping surface 136 closer to the outer diameter of the second disc 142 than the outboard clamping point 146 of the second clamping surface 138 is to the outer diameter of the first disc 140.

By positioning the outboard clamping point 150 closer to the outer diameter of the second disc 142 than the outboard clamping point 146 is to the outer diameter of the first disc 140, the second disc 142 has an extension of mass and stiffness available for resonance excitation distinct from an extension of mass and stiffness of the first disc 140 available for resonance excitation. In other words, by altering the clamping point of a member, the free body resonance frequency of that member changes. By having the extension of mass and stiffness of the second disc 142 available for resonance excitation distinct from the extension of mass and stiffness of the first disc 140 available for resonance excitation, the free body resonance frequency of the second disc 142 is distinct from the free body resonance frequency of the first disc 140.

A chamfer 170 at the inner diameter of the second clamping surface 138 is provided to assure a centrum 172 of the second clamping surface 138 is in radial alignment with a centrum 174 of the first clamping surface 136 relative to an axis of rotation 176 of the spindle motor hub 108 (of FIG. 3).

Figure 7:
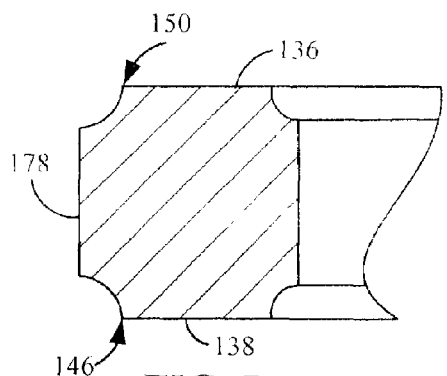
FIG. 7 is an elevational partial cutaway cross-sectional view of yet another alternate disc spacer of the disc drive of FIG. 1.

FIG. 7 shows the first clamping surface 136 of a disc spacer 178 to be substantially dimensionally equivalent to the second clamping surface 138 of the disc spacer 178. The disc spacer 178, and disc spacers that are substantially equivalent, are used in conjunction with an alternate preferred embodiment of the present invention. That alternate preferred embodiment incorporates a distinction in extension of mass and stiffness of the discs 110 used in the disc drive 100. The distinction in extension of mass and stiffness between the first disc 140 (of FIG. 3) and the second disc 142 (of FIG. 3) is provided by each disc rather than through the clamping points 150 and 146 of the disc spacer 178.

Figure 8:
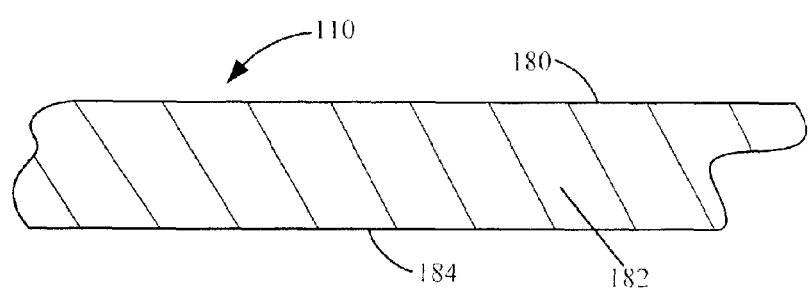
FIG. 8 is an elevational partial cutaway cross-sectional view of a disc of the disc drive of FIG. 1.

FIG. 8 shows a top recording surface 180, a substrate 182 and a bottom recording surface 184 of the disc 110. By changing the material of the substrate 182, an extension of mass and stiffness of the first disc 140 (of FIG. 3) and an extension of mass and stiffness of the second disc 142 (of FIG. 3) can be made to be distinct. By providing discs with distinct extensions of mass and stiffness, a separation in resonance excitation response of each disc can be achieved while maintaining the configuration of the first clamping surface 136 (of FIG. 3) substantially identical to the configuration of the second clamping surface 138 (of FIG. 3). An example of this alternate preferred embodiment would be a first disc 140 with a with an aluminum substrate 182, and the second disc 142 with a ceramic substrate 182.

Figure 9:
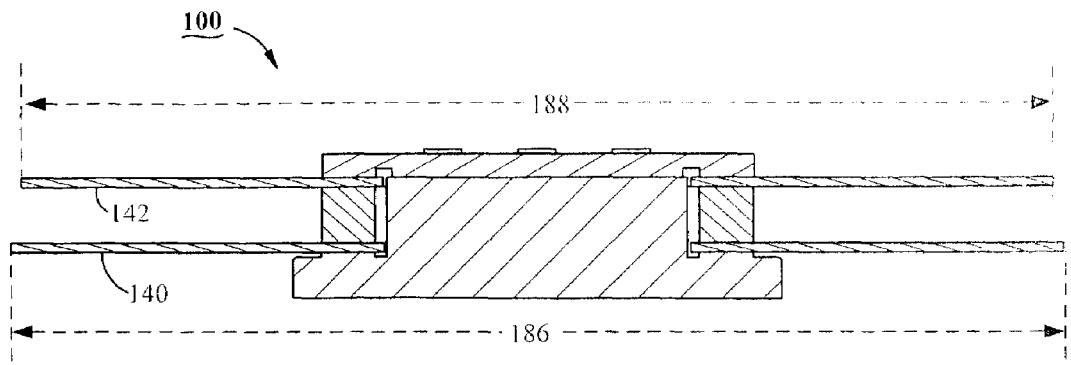
FIG. 9 is an elevational partial cross-sectional view of an alternate configuration of the disc drive of FIG. 1.

As shown by FIG. 9, an alternate preferred embodiment, an outer diameter 186 of the first disc 140 is greater than the outer diameter 188 of the second disc 142. The substrate 182 (of FIG. 8) of the first disc 140 and the substrate 182 (of FIG. 8) of the second disc 142 are of a substantially identical material, as is the inner diameter of each disc. In this embodiment, the difference in outer diameter between the first disc 140 and the second disc 142 provides separation of resonance excitation response between the first disc 140 and the second disc 142 by virtue of the second disc 142 making available a distinct extension of mass and stiffness for resonance excitation response.

Figure 10:
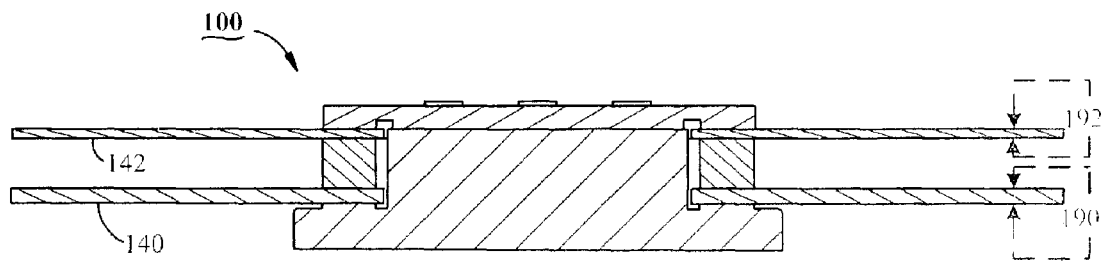
FIG. 10 is an elevational partial cross-sectional view of another alternate configuration of the disc drive of FIG. 1.

FIG. 10 shows an additional alternate preferred embodiment of the present invention. For the alternate preferred embodiment shown by FIG. 10, the distinction in extension of mass and stiffness available for resonance excitation is provided by a difference in thickness of the substrate between the first disc 140 and second disc 142. It can be seen that the substrate thickness 190 of the first disc 140 is greater than the substrate thickness 192 of the second disc 142. In this embodiment the difference in thickness between the first disc 140 and a second disc 142 provides separation of resonance excitation response between the first disc 140 and the second disc 142.

Figure 11:
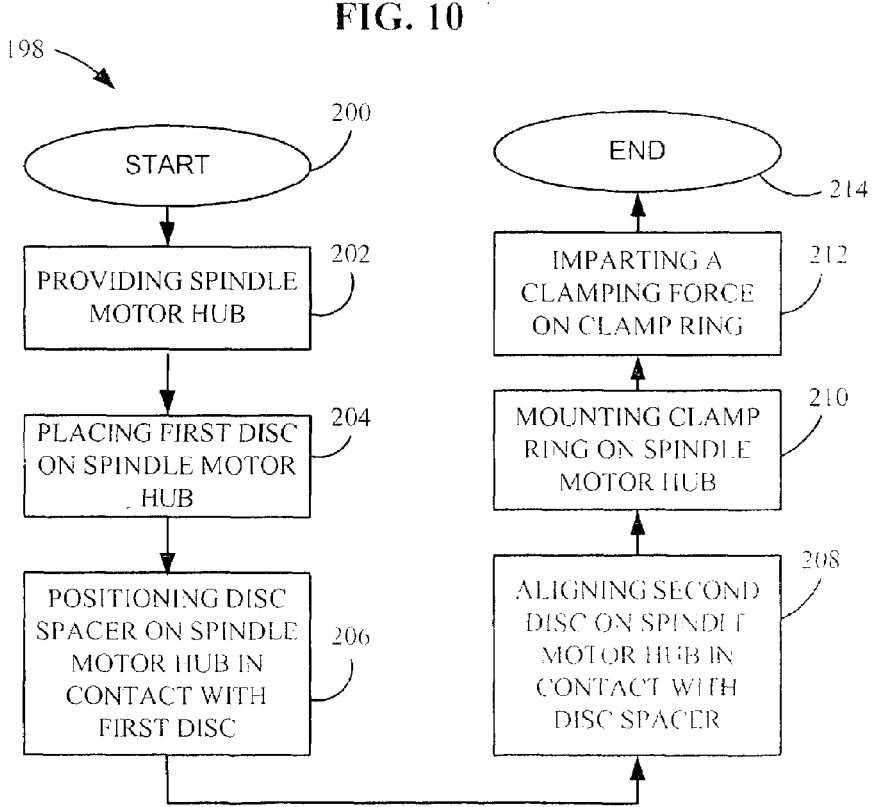
FIG. 11 is a method of assembling the disc drive of FIG. 1.

FIG. 11 shows a flowchart 198 of a method of assembling a disc drive (such as 100) in accordance with preferred embodiments of the present invention starting at start process step 200 and continuing at process step 202, where a spindle motor hub (such as 108) with a clamp support surface (such as 158) is provided. At process step 204 a first disc (such as 140) is disposed over the spindle motor hub into mating contact with the clamp support surface. At process step 206, a disc spacer (such as 128), which includes an inner diameter chamfer (such as 132) and an outer diameter chamfer (such as 134), which defines a first clamping surface (such as 136), is positioned in mating contact with the first disc. The disc spacer also includes a dimensionally distinct second clamping surface (such as 138) that is in mating contact with the first disc.

At process step 208 a second disc (such as 142) is disposed over the spindle motor and into mating contact with the first clamping surface of the disc spacer. Continuing with process step 210, a clamp ring (such as 152), with a clamp surface (such as 154), is mounted on the spindle motor hub using a plurality of fasteners (such as 156). At process step 212, by securing the clamp ring with the plurality of fasteners to the spindle motor hub, the clamp ring imparts a clamping force on the second disc to: substantially secure the second disc relative to the clamping ring; substantially secure the disc spacer relative to the second disc; substantially secure the first disc relative to the disc spacer; and, maintain mechanical alignment between the first disc, the disc spacer, the second disc and the spindle motor hub over the operating life of the disc drive. The method of assembling the disc drive includes the end process step 214.

In accordance with preferred embodiments in a disc drive (such as 100), a resonance excitation response of a first disc (a such as 140) is separated from a resonance excitation response of a second disc (such as 142) by controlling the amount of disc extension of mass and stiffness available for resonance excitation response. Separation of resonance between the first disc and the second disc deters sympathetic resonance between the discs and promotes damping of disc resonance by a spindle motor (such as 108).

In a preferred embodiment, a clamping point (such as 150) of a first clamping surface (such as 136) of a disc spacer (such as 128) contacts the second disc at a radial position adjacent an inner diameter of the second disc, such that the radial extent of the second disc extending beyond the clamp point to an outer diameter of the second disc is greater than the radial extent of the first disc extending beyond a clamping point (such as 146) of a second clamping surface (such as 138) of the disc spacer. The difference in the clamping point of each disc provides the means for separating the resonance response of each disc. The availability of the extension of mass and stiffness of the first disc for response to a resonance excitation, distinct from the availability of the extension of mass and stiffness of the second disc causes the first disc to remain immune from resonances causing excitation of the second disc.

A clamp ring (such as 152) with a clamp surface (such as 154) imparts a clamping force on the second disc to maintain substantial mechanical alignment between the second disc, the disc spacer, the first disc and a clamp support surface (such as 158) of a spindle motor hub (such as 108) of the spindle motor. By maintaining substantially a mirror image between the first clamping surface of the disc spacer and the clamp surface of the clamp ring, while maintaining substantially a mirror image between the second clamping surface of the disc spacer and the clamp support surface of the spindle motor hub, distortion of the first disc and the second disc as a result of the clamp ring imparting a clamping force on the second disc.

In an alternate preferred embodiment, a difference in material used in forming a substrate (such as 182) for each disc provides the means for separating the resonance response of each disc. In another alternate preferred embodiment, a difference in an outer diameter (such as 186) of the first disc and an outer diameter (such as 188) of the second disc provides the means for separating the resonance response of each disc. In a further alternate preferred embodiment, a difference in a thickness (such as 190) of the substrate of the first disc and a thickness (such as 192) of the substrate of the second disc provides the means for separating the resonance response of each disc.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts, within the principles of the present invention to the full extent indicated by the broad general meaning of the terms in which the appended claims are expressed without departing from the spirit and scope of the present invention.

What is claimed is:

1. An apparatus comprising first and second rotatable discs with an intervening annular spacer compressed therebetween, the spacer is made of a single uniform material and comprising, a first outermost clamping point which contactingly engages the first disc at a first distance from an outermost periphery of the first disc, and a second outermost clamping point which contactingly engages the second disc at a second distance from the outermost periphery of the second disc, wherein the second distance is less than the first distance.

2. The apparatus of claim 1, in which the first disc has a free body resonance frequency distinct from a free body resonance frequency of the second disc.

3. The apparatus of claim 1, in which the spacer further comprises:
   a spacer body portion of said unitary material construction;
   a first clamping surface extending along the spacer body portion; and
   a second clamping surface extending along the spacer body portion and substantially parallel to the first clamping surface, wherein the first clamping surface has less surface area than the second clamping surface.

4. The apparatus of claim 1, further comprising a spindle motor hub to which the first and second discs and the spacer are attached.

5. The apparatus of claim 3, further comprising a clamp ring secured to a spindle motor hub imparting a clamping force on the second disc to substantially secure the second disc relative to the clamp ring, to substantially secure the spacer relative to the second disc and to substantially secure the first disc relative to the spacer.

6. The apparatus of claim 5, in which the clamp ring comprises a clamp surface with a surface area substantially similar to the surface area of the first clamping surface, wherein the second disc is interposed between the clamp surface and the first clamping surface, and wherein a centrum of the first clamping surface, a centrum of the second clamping surface and a centrum of the clamp surface are in substantial radial alignment with an axis of rotation of the spindle motor hub.

7. The apparatus of claim 1, in which a substrate of the first disc and a substrate of the second disc are of a dissimilar material of substantially equal size, wherein the difference between the substrate material of the first disc and the substrate material of the second disc provides separation of resonance excitation response between the first disc and the second disc.

8. The apparatus of claim 1, in which a substrate of the first disc and a substrate of the second disc are of a similar material, have substantially equal inner diameters and have substantially dissimilar outer diameters, wherein the difference in outer diameter between the first disc and the second disc provides separation of resonance excitation response between the first disc and the second disc.

9. The apparatus of claim 1, in which a substrate of the first disc and a substrate of the second disc are of a similar material, have substantially equal inner diameters, substantially equal outer diameters and substantially dissimilar substrate thicknesses, wherein the difference in substrate thickness between the first disc and the second disc provides separation of resonance excitation response between the first disc and the second disc.

10. An apparatus comprising an annular spacer configured for compression between adjacent first and second rotatable discs, the spacer is made of a single uniform material and comprising, a first outermost clamping point configured to contactingly engage the first disc at a first distance from a central rotational axis of the discs, and a second outermost clamping point configured to contactingly engage the second disc at a second distance from the central rotational axis greater than the first distance.

11. The apparatus of claim 10, wherein the spacer further comprises opposing inner and outer annular sidewalls and opposing first and second clamping surfaces between said inner and outer annular sidewalls, wherein the first outermost clamping point comprises an outermost extent of the first clamping surface, and wherein the second outermost clamping point comprises an outermost extent of the second clamping surface.

12. The apparatus of claim 11, wherein the inner annular sidewall extends at a first angle with respect to the central rotational axis, wherein the outer annular sidewall extends at a second angle wit respect to the central rotational axis, and wherein the second angle is greater than the first angle.

13. An apparatus comprising a spindle motor hub, first and second rotatable discs affixed to the hub, and an annular spacer compressed between the first and second discs, the spacer is made of a single uniform material and comprising, a first outermost clamping point which contactingly engages the first disc at a first distance from an outermost periphery of the first disc, and a second outermost clamping point which contactingly engages the second disc at a second distance from the outermost periphery of the second disc, wherein the second distance is less than the first distance.

14. The apparatus of claim 13, wherein the spacer further comprises:
   a spacer body portion;
   a first clamping surface extending along the spacer body portion; and
   a second clamping surface extending along the spacer body portion and substantially parallel to the first clamping surface, wherein the first clamping surface has less surface area than the second clamping surface.

15. The apparatus of claim 14, further comprising a clamp ring secured to the spindle motor hub imparting a clamping force on the second disc to substantially secure the second disc relative to the clamp ring, to substantially secure the spacer relative to the second disc and to substantially secure the first disc relative to the spacer.

16. The apparatus of claim 15, wherein the clamp ring comprises a clamp surface with a surface area substantially similar to the surface area of the first clamping surface, wherein the second disc is interposed between the clamp surface and the first clamping surface, and wherein a centrum of the first clamping surface, a centrum of the second clamping surface and a centrum of the clamp surface are maintained in substantial radial alignment with an axis of rotation of the spindle motor hub during deformation of said discs.

17. The apparatus of claim 13, in which a substrate of the first disc and a substrate of the second disc are of a dissimilar material of substantially equal size, wherein the difference between the substrate material of the first disc and the substrate material of the second disc provides separation of resonance excitation response between the first disc and the second disc.

18. The apparatus of claim 13, in which a substrate of the first disc and a substrate of the second disc are of a similar material, have substantially equal inner diameters and have substantially dissimilar outer diameters, wherein the difference in outer diameter between the first disc and the second disc provides separation of resonance excitation response between the first disc and the second disc.

19. The apparatus of claim 13, in which a substrate of the first disc and a substrate of the second disc are of a similar material, have substantially equal inner diameters, substantially equal outer diameters and substantially dissimilar substrate thicknesses, wherein the difference in substrate thickness between the first disc and the second disc provides separation of resonance excitation response between the first disc and the second disc.

* * * * *